(12) United States Patent
Faisman et al.

(10) Patent No.: US 7,412,387 B2
(45) Date of Patent: Aug. 12, 2008

(54) AUTOMATIC IMPROVEMENT OF SPOKEN LANGUAGE

(75) Inventors: Alexander Faisman, Croton-on-Hudson, NY (US); Dimitri Kanevsky, Ossining, NY (US); Zohar Sivan, Zichron-Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 655 days.

(21) Appl. No.: 11/037,750

(22) Filed: Jan. 18, 2005

(65) Prior Publication Data

US 2006/0161434 A1    Jul. 20, 2006

(51) Int. Cl.
*G10L 15/26* (2006.01)

(52) U.S. Cl. .................................................. 704/257
(58) Field of Classification Search ............... 704/257
See application file for complete search history.

(56) References Cited

U.S. PATENT DOCUMENTS

| | | | | |
|---|---|---|---|---|
| 4,343,969 A | * | 8/1982 | Kellett | 704/254 |
| 4,716,593 A | * | 12/1987 | Hirai et al. | 704/247 |
| 4,979,213 A | * | 12/1990 | Nitta | 704/245 |
| 7,016,849 B2 | * | 3/2006 | Arnold et al. | 704/275 |

* cited by examiner

*Primary Examiner*—Susan McFadden

(57) ABSTRACT

A method for improving spoken language includes accepting a speech input from by a speaker using a language, identifying the speaker with a predetermined speaker category and correcting an error in the speech input using an error model that is specific to the speaker category.

14 Claims, 2 Drawing Sheets

AUTOMATIC IMPROVEMENT OF SPOKEN LANGUAGE

FIELD OF THE INVENTION

The present invention relates generally to speech processing and specifically to methods and systems for automatic improvement of spoken language.

BACKGROUND OF THE INVENTION

The automatic processing of spoken language encompasses a wide variety of technologies and applications. Automatic speech-to-text conversion enables automatic transcription of speeches, conversations and audio broadcasts. Automatic speech recognition, or voice recognition, enables users to use their mobile phones, access databases and control home appliances using voice commands. Speaker recognition technologies are used in authentication applications and surveillance systems.

Speech processing is closely related to Natural Language Processing (NLP), a group of technologies that interpret and process speech data using linguistic models.

Processing of speech, or spoken language, is covered extensively in the patent literature. For example, U.S. Pat. No. 5,946,656 describes a method for speech and speaker recognition using Hidden Markov models (HMM). U.S. Pat. No. 4,060,694 discloses a method for speech recognition adapted to a plurality of different speakers. The disclosures of these patents and of the patents and publications cited below are incorporated herein by reference.

Several speech processing applications utilize characteristics of the speaker. For example, U.S. Patent Application Publication 2002/0095295 describes a system that uses automatic speech recognition to provide dialogs with human speakers. The system automatically detects characteristics of the speaker, his speech, his environment, or the speech channel used to communicate with the speaker. U.S. Patent Application Publication 2004/0002994 describes a system and method for performing automated error correction of user input data via an analysis of the input data in accordance with a database of past user activities, such as phrases, topics, symbols and speech samples.

Other speech processing applications utilize the characteristics of the spoken language. For example, U.S. Pat. No. 6,526,382 describes a voice activated user interface having a semantic and syntactic structure adapted to the culture and conventions of spoken language. For example, U.S. Patent Application Publication 2003/0061030 presents a natural language processing apparatus, which executes morphological analysis. U.S. Patent Application Publication 2004/0193401 discloses linguistically-informed statistical models of constituent structure for ordering in sentence realization for a natural language generation system. U.S. Pat. No. 5,999,896 describes a method and system for identifying and resolving commonly confused words in a natural language parser. U.S. Pat. No. 5,926,784 describes a method and system for natural language parsing.

SUMMARY OF THE INVENTION

Spoken language typically contains errors of usage and syntax. These errors may be particularly severe when the language of speech is not the native language of the speaker. Therefore, many speech-to-text applications could benefit from correcting errors in the language of the output text. Automatic stenography systems, for example, can thus produce higher quality transcriptions for their clients. Additionally, automatically-transcribed text is sometimes used as an input for a machine translation system, which translates the text to another language. The quality of machine-translation is enhanced if the original text is relatively error-free and conforms to typical language rules and formats.

In response to this need for improving spoken language, embodiments of the present invention provide methods and systems for converting speech to text, while improving the language properties of the output by correcting speaker errors. Speaker errors may be semantic (i.e., relating to individual words and their meaning) or syntactic (i.e., relating to the grammatical arrangement of words in a sentence). In particular, some embodiments of the present invention enhance the performance of real-time "human-to-human" interactions, such as conference calls and on-line machine translation.

Some embodiments of the present invention use the fact that different categories of speakers often share common speech errors. For example, Russian native speakers typically make similar grammatical errors when speaking English. Young children are another category of speakers, sharing common speech errors. A database of common speech errors, both grammatical and semantic, is maintained for every such category. Once a speaker has been successfully associated with a certain category, his speech may be improved by applying a set of correction rules that are specific to the category. A speaker may be associated with a speaker category based on a-priori knowledge, or based on the analysis of a speech sample.

Another disclosed method improves speech at the phonetic level, without necessarily converting it to text. The conversion process comprises detecting a string of phonemes, or syllables, that represent errors, and replacing it with the correct string of phonemes or syllables according to a pre-determined set of rules.

There is therefore provided, in accordance with an embodiment of the present invention, a method for improving spoken language, including:

accepting a speech input from by a speaker using a language;

identifying the speaker with a predetermined speaker category; and correcting an error in the speech input using an error model that is specific to the speaker category.

In a disclosed embodiment, accepting the speech input includes converting the speech input to a text input using a speech-to-text converter.

Additionally or alternatively, correcting the error includes correcting a semantic error in the text input.

Further additionally or alternatively, correcting the error includes correcting a syntax error in the text input.

In another embodiment, correcting the syntax error includes defining a sequence of states corresponding to context classes of the speech input, and analyzing the sequence in order to correct the error.

In yet another embodiment, correcting the error includes generating an improved text responsively to the text input and to the error.

In still another embodiment, correcting the error includes generating an improved speech output responsively to the improved text.

In another embodiment, generating the improved text includes presenting the improved text to a human operator for verification.

In a disclosed embodiment, identifying the speaker includes establishing a personal identity of the speaker, and the error model includes a personal error profile of the speaker.

In another embodiment, the speaker category includes a national origin of the speaker, and the error model includes a model of typical errors made by speakers of the national origin.

Additionally or alternatively, the error model is specific to the language.

In an embodiment, the speaker category includes a category of children, and the error model includes a model of typical errors made by children.

In another embodiment, identifying the speaker includes determining the speaker category responsively to the speech input.

In yet another embodiment, correcting the error includes correcting a phonetic error in the speech input, and the error model includes phonetic rules.

There is also provided, in accordance with an embodiment of the present invention, apparatus for improving spoken language, including:

a memory, which is arranged to store a language model database, including one or more error models relating to one or more respective speaker categories; and a language improver, which is arranged to accept a speech input from by a speaker using a language, to identify the speaker with a speaker category, and to correct an error in the speech input using one of the error models that is specific to the speaker category.

There is additionally provided, in accordance with an embodiment of the present invention, a computer software product for improving spoken language, the product including a computer-readable medium in which program instructions are stored, which instructions, when read by the computer, cause the computer to access one or more error models relating to one or more respective speaker categories, to accept a speech input from by a speaker using a language, to identify the speaker with a speaker category and to correct an error in the speech input using one of the error models that is specific to the speaker category.

The present invention will be more fully understood from the following detailed description of the embodiments thereof, taken together with the drawings in which:

DETAILED DESCRIPTION OF EMBODIMENTS

Figure 1:
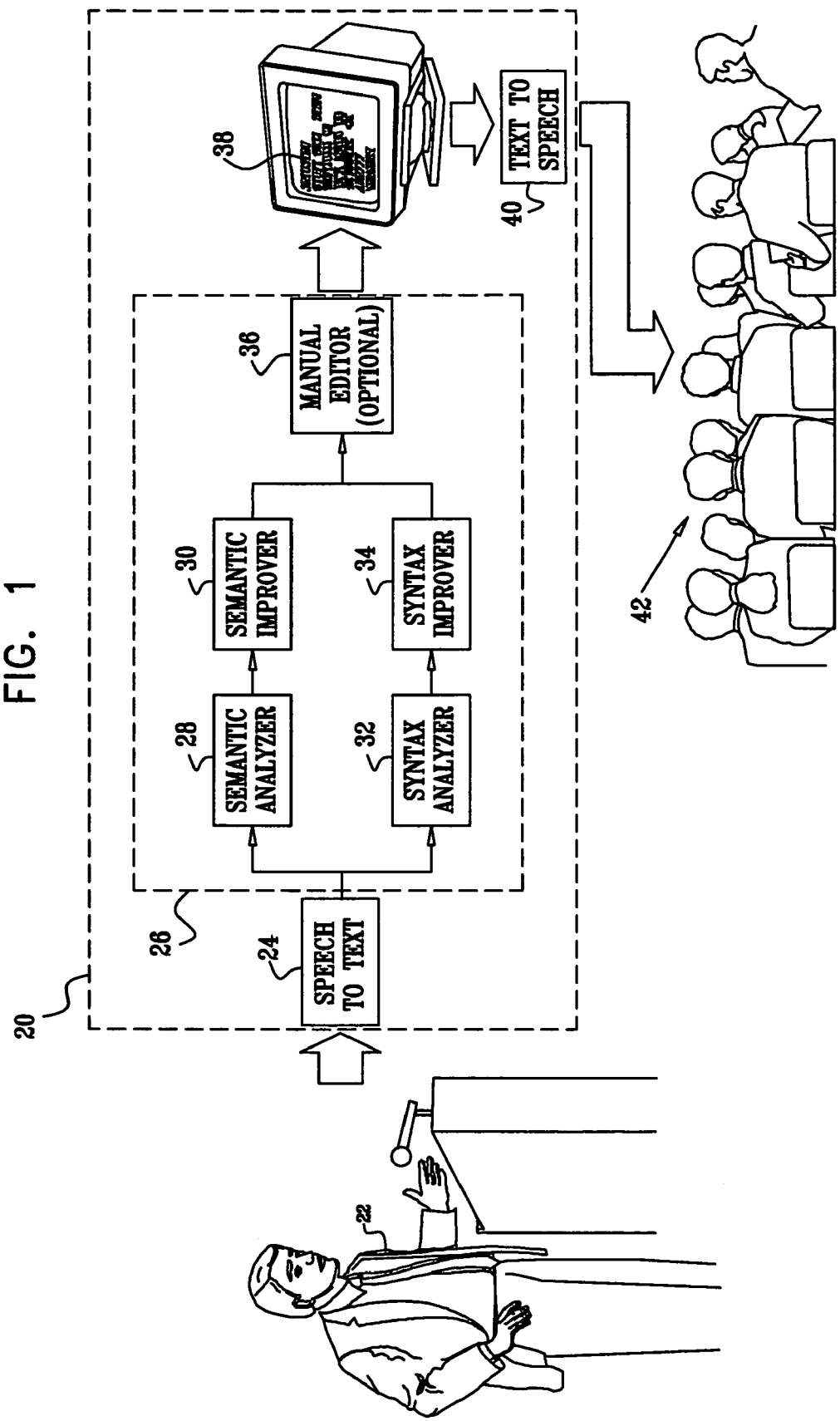
FIG. 1 is a block diagram that schematically illustrates a system for improving spoken language, in accordance with an embodiment of the present invention.

FIG. 1 is a block diagram that schematically illustrates a system 20 for improving spoken language, in accordance with an embodiment of the present invention. System 20 accepts as input speech information from a speaker 22. The speech information is converted to text using a speech-to-text converter 24. There are several techniques known in the art for converting speech to text, and converter 24 may apply any such method. The text output by converter 24 is delivered to a language improver 26 for improving the language properties of the text by correcting speech errors introduced by speaker 22. Speech errors may comprise semantic errors (e.g., word usage and pronunciation errors) and syntax (grammatical) errors.

Language improver 26 comprises two parallel data channels. The first channel is a semantic channel, comprising a semantic analyzer 28 and a semantic improver 30. The second channel is a syntactic channel, comprising a syntax analyzer 32 and a syntax improver 34. The operation of these channels is described in greater detail hereinbelow. Although the channels are shown in FIG. 1 as separate entities for the sake of conceptual clarity, in practice these channels may simply be implemented as different processing tasks running on the same processing platform. In alternative embodiments, not shown in the figures, one of the semantic and syntactic channels may be used on its own for language improvement, without the other channel.

Once the semantic and the syntactic properties of the input text have been improved, the text is transferred to an optional manual editor 36, wherein a human operator may verify and approve the modifications to the text. Following verification, the language improver outputs an improved text 38. In some embodiments the manual editor is omitted, resulting in a fully-automatic process. Optionally, improved text 38 is converted back to speech using a text-to-speech converter 40. Converter 40 may use any suitable text-to-speech conversion technique known in the art. A listener 42 hears the improved speech played by the text-to-speech converter.

Language improver 26 typically comprises a general-purpose computer, which is programmed in software to carry out the functions described herein. Alternatively, the functions of the language improver may be distributed among several computers. The software may be downloaded to the computer or computers in electronic form, over a network, for example, or it may alternatively be supplied on tangible media, such as optical, magnetic or electronic storage media.

Figure 2:
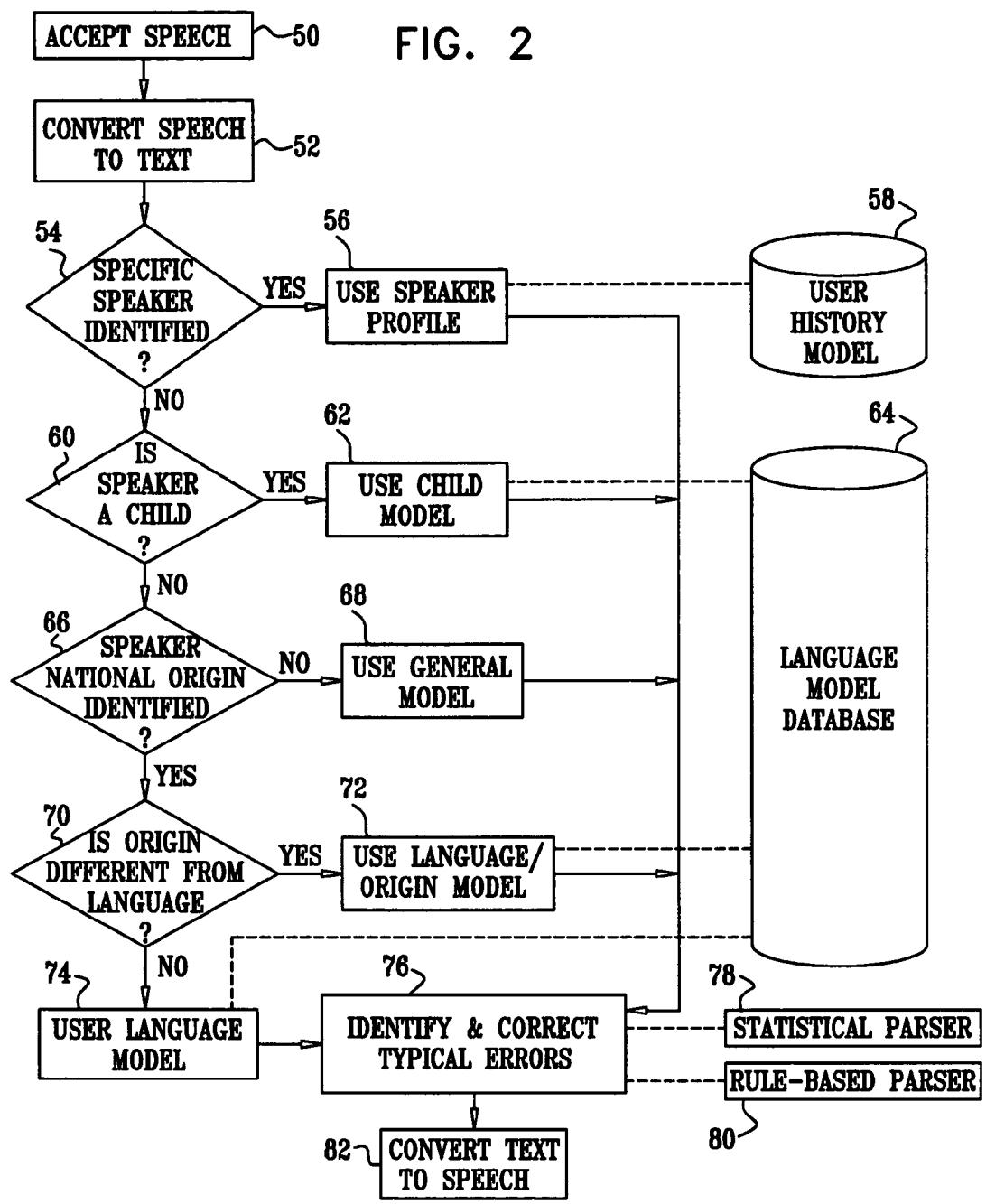
FIG. 2 is a flow chart that schematically illustrates a method for improving spoken language, in accordance with an embodiment of the present invention.

FIG. 2 is a flow chart that schematically illustrates a method for improving spoken language used in system 20, in accordance with an embodiment of the present invention. The method begins by accepting speech information from speaker 22 at a speech acceptance step 50. The speech is converted to text using speech-to-text converter 24, at a speech conversion step 52.

Language improver 26 tries to categorize the speaker, using the text and the speech information, in a known speaker category. If the speaker can be successfully associated with a known category, the language improver can better identify and correct speech errors using an error model, i.e., a list of typical errors that characterize this category of speakers. For this purpose, the language improver first checks whether it can identify the specific speaker, at a speaker identification step 54. Speaker identification may be based on techniques of voice recognition, as are known in the art, or on explicit input of the speaker identity. If successful in identifying the speaker, the language improver retrieves a speaker profile, comprising speech errors typical to this specific person, at a profile retrieval step 56. The speaker identification and speaker profile are typically based on data stored during past use of system 20 by this speaker. The profile may be generated automatically or with operator assistance, using editor 36, for example. Speaker profiles are stored in a user history model database 58, maintained by the language improver.

If the specific speaker cannot be identified, the language improver tried to associate it with a known category. For example, the language improver may check whether the speaker is a child, at a child identification step 60. If successful, the language improver retrieves a child error model, at a child model retrieving step 62. The child error model comprises speech errors typical of children. The child error model, as well as other language error models described hereinbelow, are stored in a language model database 64, which is maintained in a memory by the language improver.

Alternatively or additionally, the language improver checks whether the national origin of the speaker can be identified, at an origin identification step 66. Again, the national origin of the speaker may be identified by explicit input or it may be determined automatically by the language improver based on phonetic characteristics (i.e., accent) and/or linguistic characteristics of the input speech. If unsuccessful in categorizing the speaker, the language improver reverts to a general error model, without association to any known speaker category. A general error model is then retrieved at a general model retrieving step 68.

If, on the other hand, the language improver was able to identify the national origin of the speaker, it tries to further differentiate the speaker category by checking whether the national origin is different from the language of the speech, at a different language checking step 70. The underlying assumption is that there are typical speech errors that characterize speakers of a particular national origin when they speak a certain foreign language. These errors result, inter alia, from differences between the grammars of the two languages. Speakers tend to apply some of the grammatical rules and syntax of their native language when speaking in a foreign language. For example, Russian native speakers typically make similar speech errors when speaking English, such as omission of the articles "a" and "the," which have no equivalent in Russian. These typical errors may be identified and corrected using methods that are described hereinbelow. If the national origin of the speaker can indeed be identified as being different from the language spoken, the language improver retrieves a language/origin error model, at an origin model retrieving step 72. If the speaker origin cannot be identified as being different from the language spoken, the language improver retrieves a language-specific error model at a user language model retrieving step 74. The language-specific model comprises typical errors made by speakers of the particular language, regardless of speaker origin.

The disclosed method, by way of example, recognizes speaker categories such as children, speakers of a particular national origin, and non-native speakers. Other speaker categories that comprise typical language error patterns will be apparent to those skilled in the art.

Having retrieved an appropriate language error model, the language improver uses this model to identify and correct speech errors at a language improving step 76. As described in FIG. 1 hereinabove, this process may involve correction of semantic errors (phrases containing erroneous semantic content, e.g., "green sky" instead of "blue sky"), syntax errors (such as errors in grammar and word order typically made by non-native speakers of a language), as well as spelling errors, pronunciation errors and errors introduced by speech-to-text converter 24.

Various methods may be applied at step 76 for identifying and correcting different types of errors. Spelling errors, and to some extent pronunciation errors, are typically corrected using dictionaries and automatic spell-checkers. Some methods also use the context of the entire phrase to correct a spelling error, especially when there are several alternative corrections to choose between. Some methods use statistical information about the structure of sentences in the language for identifying syntax errors. For example, the language improver may use a statistical parser 78 for correcting grammatical speech errors.

Semantic errors may be corrected by a phrase generator that replaces erroneous phrases with corrected phrases, based on the context of the sentence. Some techniques for semantic phrase generation are described, for example, in U.S. Pat. No. 6,236,968, whose disclosure is incorporated herein by reference. Semantic parsing techniques for detecting and fixing semantic errors are also known in the art.

Figure 3:
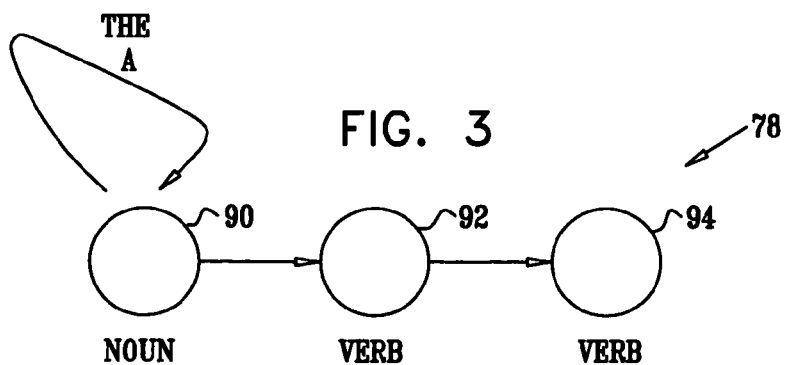
FIG. 3 is a state diagram that schematically illustrates operation of a statistical parser, in accordance with an embodiment of the present invention.

Reference is now made to FIG. 3, which is a state diagram that schematically illustrates the operation of statistical parser 78, in accordance with an embodiment of the present invention. The figure describes an example of a hidden Markov model-based statistical parser, which is used to add missing articles to the speech of a Slavic-language speaker. Statistical parser 78 typically uses multiple structures of this sort to correct errors of different types.

Parser 78 evaluates a sequence of states, in which each state corresponds to a context class of a successive word in the text stream. For example, a state 90 is a context class containing a noun output by speech-to-text converter 24. States 92 and 94 are context classes containing verbs. The parser determines, based on the noun and verb context classes, whether to add the article "a" or "the" before the noun in state 90. The parser may also determine that the noun in state 90 is an indefinite plural noun, in which case no article is added. To choose the appropriate article (or no article), the parser evaluates probability metrics of different possible state sequences that may correspond to the text stream.

Returning to the description of FIG. 2, the language improver may alternatively or additionally use a rule-based parser 80 for correcting speech errors. The rule-based parser typically comprises a list of erroneous text streams and their corrected versions, or explicit grammatical rules that can be enforced upon the text stream.

In another embodiment, the language improver may correct errors introduced by speech-to-text converter 24. Several techniques known in the art can determine whether a speech sample was converted correctly to text by an ASR (Automatic Speech Recognition) converter, such as methods based on maximization of a confidence score. Any of these techniques may be used to differentiate whether an error was introduced by a speaker or by the speech-to-text converter.

The output of step 76 is improved text 38. As noted above, the improved text is optionally converted back to improved speech at a text-to-speech conversion step 82.

In an alternative embodiment, not shown in the figures, the language improver improves speech without necessarily converting it to text. The language improver detects sounds that should be transformed into different sounds as speech phonemes (e.g., an "a" sound that should be replaced with a "the" sound). The language improver maintains a database of phonetic rules and applies these rules to replace erroneous sounds with improved sounds. The replaced sounds are input directly to a speech synthesizer that generates the improved speech stream. This method may be used for correcting speech errors and for improving the accent of a non-native speaker, as well as for improving the pronunciation of typically-mispronounced words or phrases. It may be used separately from or in conjunction with the semantic and syntactic methods described above.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for improving spoken language, comprising:
predefining a plurality of speaker categories having respective specific error models;
accepting a speech input from a speaker using a language;
identifying the speaker with one of the predefined speaker categories; and
correcting an error in the speech input using specific error model of the one of the speaker categories.

2. A method according to claim 1, wherein accepting the speech input comprises converting the speech input to a text input using a speech-to-text converter.

3. The method according to claim 2, wherein correcting the error comprises correcting a semantic error in the text input.

4. The method according to claim 2, wherein correcting the error comprises correcting a syntax error in the text input.

5. The method according to claim 4, wherein correcting the syntax error comprises defining a sequence of states corresponding to context classes of the speech input, and analyzing the sequence in order to correct the error.

6. The method according to claim 2, wherein correcting the error comprises generating an improved text responsively to the text input and to the error.

7. The method according to claim 6, wherein correcting the error comprises generating an improved speech output responsively to the improved text.

8. The method according to claim 6, wherein generating the improved text comprises presenting the improved text to a human operator for verification.

9. The method according to claim 1, wherein identifying the speaker comprises establishing a personal identity of the speaker, and wherein the specific error model comprises a personal error profile of the speaker.

10. The method according to claim 1, wherein the one of the predefined speaker categories comprises a national origin of the speaker, and wherein the specific error model comprises a model of typical errors made by speakers of the national origin.

11. The method according to claim 10, wherein the specific error model is specific to the language.

12. The method according to claim 1, wherein the one of the predefined speaker categories comprises a category of children, and wherein the specific error model comprises a model of typical errors made by children.

13. The method according to claim 1, wherein identifying the speaker comprises determining the one of the predefined speaker categories responsively to the speech input.

14. The method according to claim 1, wherein correcting the error comprises correcting a phonetic error in the speech input, and wherein the specific error model comprises phonetic rules.

* * * * *